Patented Aug. 16, 1932

1,872,033

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

FAST AZO DYE

No Drawing.   Application filed February 2, 1931. Serial No. 513,055.

The present invention is concerned with azo dyes of direct-developed type, particularly with such azo dyes prepared by coupling diazo components into 2.3-hydroxynaphthoylamino-chloro-diphenyloxide.

It is well known that arylides such as naphthol AS, i. e. 2.3-hydroxynaphthoyl aniline, can be employed for the production of azo dyes which are fast to light and washing, by coupling diazo components thereinto. I now have discovered that new azo dyes of such type can be prepared by coupling a diazo component into a 4-(2'.3'-hydroxynaphthoylamino)-2-halo-diphenyloxide, my new dyes being characterized by increased stability to light, bleaching, and washing, and by the production of clear bright colors. The formula of my new azo dyes may be represented as follows:—

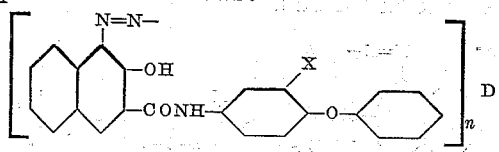

wherein X represents a halo group, D a residue from any diazo component, $n$ is an integer equalling the number of diazo groups in D, and wherein the several groups and residues may be further substituted.

My invention, then, consists of the steps and products hereinafter fully described and particularly pointed out in the claims, the following description setting forth but several of the various ways in which the principle of my invention may be used.

2-chloro-4-amino-diphenyloxide, as an example of my new substituted diphenyloxide, may readily be made in good yields from ortho-dichlorobenzene, a by-product obtained in the manufacture of monochlorobenzene. Said ortho-dichlorobenzene is nitrated to form 1.2-dichloro-4-nitro-benzene. The latter compound then is reacted with potassium phenate to form 2-chloro-4-nitro-diphenyloxide, which latter then is reduced to form 2-chloro-4-amino-diphenyloxide. Said amine may then be reacted with 2.3-hydroxynaphthoic acid chloride, or with the free acid in the presence of a condensing agent, e. g. phosphorus trichloride, and in the presence of toluene as a solvent or diluent, to form an arylide.

My new azo dyes may be formed from diazo components and the abovementioned arylides as coupling components in any preferred way, such as by developing on the fiber, by printing a diazo solution upon padded goods according to the well-known method, by using nitrosamine salts of the corresponding bases, or by preparing such dyes in substance for use as pigments, etc. Mordanting or other auxiliary treatment for promoting the absorption of the dye on the fiber or after-treatment with metal salts, such as chromium, copper, or aluminum salts, for fixing the dye, modifying its color tone, or improving the fastness of the dye, may optionally be employed in conjunction with the dyeing operation without departing from the spirit of the invention which is intended to include not only the dyes themselves, but also material dyed therewith.

The following specific example illustrates one of the several ways in which my invention may be utilized:—

Example 1

4.2-(2'.3'-hydroxynaphthoylamino-)-chloro-diphenyloxide was prepared by condensing substantially equimolecular amounts of 2.3-hydroxynaphthoic acid and 4.2-aminochloro-diphenyloxide with the aid of phosphorus trichloride in the presence of toluene in the usual manner, the desired arylide forming a solid phase inter-mixed with a liquid medium. The so prepared arylide melted at 210° to 212° C.

Cotton fibers are impregnated with a slightly alkaline solution of the above arylide to which may be added advantageously, but not necessarily, formaldehyde and/or other fixative, e. g. Turkey-red oil or an aluminum salt. Said fibers are then immersed in a diazo solution prepared from 2.amino-4.5-dichloro-diphenyloxide. The dye develops on the fiber, is Goya in color, and has the formula:—

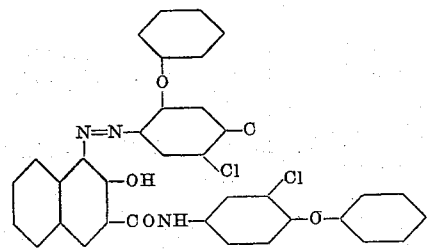

In like manner, I have prepared other dyes of the same general type, for example, those shown in the table on the following page, the colors of the dyes being designated according to the "Standard Color Card of America", (1928 Ed.), issued by "The Textile Color Card Association of the United States, Inc".

| Diazo component | Color of dye |
|---|---|
| 1-amino-3-chloro-4.6-dimethoxy-benzene | Light claret |
| 1-amino-4-benzoylamino-naphthalene | Dark heliotrope |
| 4-amino-2-chloro-diphenyloxide | Goya |
| 3.4-dichloro-aniline | Pimento |
| 3-nitro-aniline | Paprika |
| 3-benzoylamino-aniline | Castilian red |
| 2-chloro-4-nitro-aniline | Castilian red |
| 2-amino-diphenyloxide | Castilian red |
| 4-nitro-ortho-toluidine | Castilian red |
| 2.4.5-trichloro-aniline | Castilian red |
| 1-amino-5.8-dichloro-naphthalene | Light claret |
| 1-amino-naphthalene | Light claret |
| 1-amino-3-chloro-4.6-dimethoxy-benzene | Claret |
| 2-methoxy-5-amino-diphenyl | Claret |
| Diamino-dibromo-carbazole | Mulberry fruit |
| Amino-(alpha-beta-dinaphthol) ether | Plum |
| 1-amino-4-phenoxy-naphthalene | Plum |
| Diamino-(alpha-beta-dinaphthol) ether | Plum |
| 3.3'-diamino-2.2'-dimethoxy-(1.1'-dinaphthalene). | Mulberry fruit |
| 1-amino-(3'-chloro-4'-methoxy-benzene-azo-) naphthalene. | Homage blue |
| 1-amino-2-nitro-4-methyl-benzene | Goya |
| 2.2'-diamino-4.4'-dibromo-diphenyloxide. | Goya |
| 1-amino-3-chloro-4-methoxy-benzene | Goya |
| 4.4'-diamino-diphenyloxide | Goya |
| 2-methoxy-3-chloro-5-amino-diphenyl | Goya |
| 1-amino-3.4-dichloro-6-(2'-phenyl-phenoxy)-benzene. | Scarlet |
| 4-amino-azobenzene | Dark cardinal |
| 3-amino-4-methoxy-diphenyl | Dark cardinal |
| 2-methoxy-3.5-diamino-diphenyl | Dark cardinal |
| 4-benzoylamino-aniline | Dark cardinal |
| 1.5-diamino-naphthalene | Dark egg plant |
| Benzene-azo-(1-amino-naphthalene) | Egg plant |
| (4'-amino-naphthalene-azo)-aniline | Midnight |
| 2-nitro-4-phenetidine | Dark homage blue |

Although cotton fibers have been referred to in the example as the material to be dyed with my herein described new dyes, other natural or synthetic fibers may likewise be dyed therewith, such as silk, wool, rayon, and the like.

Furthermore, I do not limit my invention to the specifically aforementioned intermediates. As diazo components, any diazotized or polyazotized amino or polyamino compound suitable for coupling with a phenolic compound to form an azo dye may be employed for combining with my hereindescribed new arylides.

In brief, my invention relates to dyes characterized by the following grouping:—

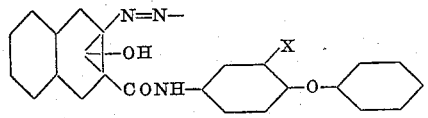

wherein X represents a halogen group, and wherein the several groups may be further substituted with e. g. halogen, nitro, hydrocarbon or other non-solubilizing groups.

Other modes of applying the principle of my invention may be employed instead of the one explained, change being made as regards the details employed, provided the steps or ingredients stated by any of the following claims or the equivalent thereof be employed.

I therefore particularly point out and distinctly claim as my invention:—

1. As a new compound, an azo dye having the general formula,

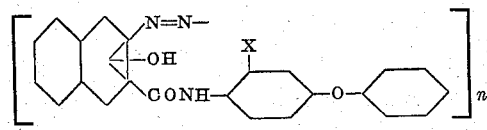

wherein X represents a halo group, D represents an aromatic residue of a diazotized aromatic amine and $n$ is the number of azo substituents linked with D.

2. The method of making an azo dye which comprises coupling any diazotized aromatic amino compound with a 4-(2'-3'-hydroxy-naphthoylamino)-2-halo-diphenyloxide.

3. As a new compound, an azo dye having the general formula,

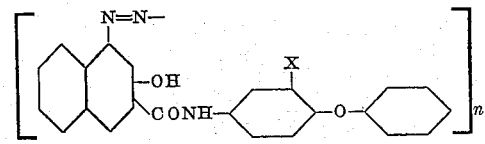

wherein X represents a halo group, D represents an aromatic residue of a diazotized aromatic amine and $n$ is the integer 1 or 2.

4. The method of making an azo dye which comprises coupling a diazotized aromatic amino compound with 4-(2'-3'-hydroxynaphthoylamino)-2-chloro-diphenyloxide.

5. As a new compound, an azo dye having the general formula,

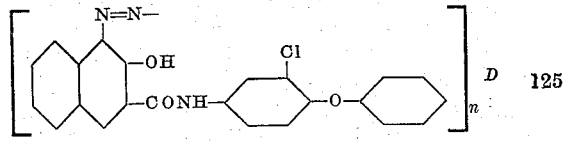

wherein D represents an aromatic residue of a diazotized aromatic amine, and $n$ is the integer 1 or 2.

6. As a new compound, an azo dye having the following general formula,
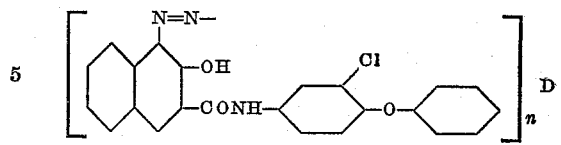
wherein D represents an aromatic residue and $n$ is the number of azo substituents linked with D.
7. As a new compound, an azo dye having the following general formula,
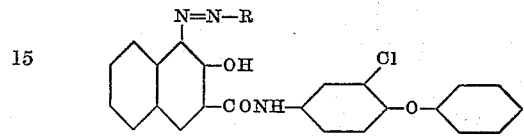
wherein R represents an aromatic residue of a diazotized aromatic amine.
Signed by me this 12 day of January, 1931.
ERNEST F. GRETHER.